United States Patent
Cordes et al.

[11] Patent Number: 5,756,236
[45] Date of Patent: May 26, 1998

[54] FABRICATION OF HIGH RESOLUTION ALUMINUM ABLATION MASKS

[75] Inventors: Steven A. Cordes, Cortlandt Manor; James L. Speidell, Poughquag, both of N.Y.; Rajesh S. Patel, Fremont, Calif.

[73] Assignee: International Business Machines Corporation, Armonk, N.Y.

[21] Appl. No.: 789,905

[22] Filed: Jan. 29, 1997

[51] Int. Cl.⁶ .................................................. G03F 9/00
[52] U.S. Cl. ........................................ 430/5; 219/121.71
[58] Field of Search ............... 430/5, 322; 219/121.68, 219/121.7, 121.71

[56] References Cited

U.S. PATENT DOCUMENTS

| | | | |
|---|---|---|---|
| 4,612,085 | 9/1986 | Jelks et al. | 156/643 |
| 4,724,219 | 2/1988 | Ridinger | 437/19 |
| 4,786,358 | 11/1988 | Yamazaki et al. | 156/643 |
| 4,842,677 | 6/1989 | Wojnarowski et al. | 156/643 |
| 4,861,421 | 8/1989 | Bienstock | 156/635 |
| 4,879,451 | 11/1989 | Gart | 219/121.69 |
| 4,923,772 | 5/1990 | Kirch et al. | 430/5 |
| 5,142,120 | 8/1992 | Hanson et al. | 219/121.83 |
| 5,223,693 | 6/1993 | Zumoto et al. | 219/121.68 |
| 5,288,664 | 2/1994 | Mukai | 437/173 |
| 5,310,986 | 5/1994 | Zumoto et al. | 219/121.7 |
| 5,349,155 | 9/1994 | Yamagishi et al. | 219/121.71 |
| 5,376,086 | 12/1994 | Khoobehi et al. | 606/4 |
| 5,482,802 | 1/1996 | Celler et al. | 430/5 |
| 5,501,925 | 3/1996 | Smith et al. | 430/5 |

OTHER PUBLICATIONS

Cuomo et al. Nov. (1993) "Metal Film/Diamond Membrane Mask for Excimer Laser Ablation Projection Etching" IBM Technical Disclosure Bulletin 36(11):583–584.

*Primary Examiner*—S. Rosasco
*Attorney, Agent, or Firm*—Scully, Scott, Murphy & Presser

[57] ABSTRACT

A method of fabricating a high resolution ablation mask for use at laser fluences of greater than 200 mJ/cm² is disclosed. The method comprises combining dry etching and chemical etching of an unetched ablation mask which comprises a transparent substrate, a layer of high UV light refractivity material, e.g. aluminum, deposited on said substrate, and a photoresist layer positioned on a predetermined area of said high UV light refractivity material layer leaving other areas of said high UV light refractivity material layer exposed.

28 Claims, 4 Drawing Sheets

FABRICATION OF HIGH RESOLUTION ALUMINUM ABLATION MASKS

DESCRIPTION

1. Technical Field

The present invention relates to a method of fabricating high resolution masks for use in laser ablation at laser fluences in the range from about 200 mJ/cm$^2$ to at least 500 mJ/cm$^2$. The method of the present invention which combines dry and chemical etching techniques improves the dimensional control of the ablation mask compared with prior art processes.

2. Prior Art

In the field of microelectric materials processing, there is a need to selectively deposit and etch targets containing metal films, glass and layers of other materials such as polymers. Laser ablation using high energy lasers directed through non-contact masks onto targets has been developed in response to this need without excessive exposure of the target to photolithographic contact masks, photoresists and/or patterned transfer layers, and the various processing and cleaning solutions involved in standard contact mask processing. In addition, the distance between the mask/optical system and the target reduces the potential for contamination of the mask/optical system by the ablated product.

One of the major drawbacks in material processing using high energy lasers is that the ablation masks must be highly resistant to laser irradiation damage. In the prior art, various types of ablation masks have been developed and have been used in laser ablation. Typically, however, the prior art ablation masks cannot be used at high laser fluences and/or they contain rather expensive materials which often times require complicated processing steps.

One of the simplest and inexpensive ablation masks known in the prior art is a metal foil mask which is generally composed of stainless steel or molybdenum metal. While generally being inexpensive, metal foil masks have low resolutions, provide poor quality and are extremely limited in the types of images they can produce.

Another relatively inexpensive type of laser ablation mask known in the art uses an apertured single layer or an apertured composite metal layer on a quartz substrate. In such ablation masks, chromium, aluminum and copper-backed aluminum have been suggested for use as the metal. While providing the quality and versatility unobtainable with metal foil masks, these ablation masks typically have a low laser damage threshold (<200 mJ/cm$^2$) which makes them unsuitable in most laser processing applications. For example, chrome/quartz masks, which are described, for instance, in U.S. Pat. No. 4,786,358, have a laser damage threshold of about 135 mJ/cm$^2$ which makes them unsuitable in laser ablation processes wherein the laser fluences are typically greater than 200 mJ/cm$^2$. A similar problem exists for aluminum/quartz masks of the prior art.

Dielectric ablation masks are also known in the art. An example of a dielectric ablation mask is disclosed, for example, in U.S. Pat. No. 4,923,772. Specifically, U.S. Pat. No. 4,923,772 discloses an ablation mask having multiple dielectric layers of alternating high and low indices of refraction on a U.V. grade synthetic fused silica substrate. The described ablation mask withstands the fluences of the high energy and high power laser employed therewith. However, these masks are relatively expensive to fabricate and the constituent dielectric material is tailored for use with a particular wavelength laser. Hence, when the laser wavelength changes, for example, when different target materials are desired to be ablated, a new dielectric mask containing different dielectric materials is required. U.S. Pat. No. 5,349,155 teaches the use of a similar dielectric ablation mask.

IBM Technical Disclosure Bulletin, Vol. 36, No. 11, November 1993, pp. 583–584, entitled "Metal Films/Diamond Membrane Mask for Excimer Laser Ablation Projection Etching" describes an ablation mask which comprises a 3–5 μm thick aluminum layer deposited on CVD diamond and covered by an anti-reflective coating. The purpose of the CVD diamond is to efficiently heat-sink the laser energy absorbed by the aluminum throughout the laser pulse duration. The described ablation mask structure is somewhat expensive and difficult to fabricate. In cases where copper is substituted for the diamond, in order to provide similar heat dissipation, the formation of alloys of copper and aluminum at the aluminum-copper interface reduces the reflectance of the aluminum and increases the risk of metal/mask feature destruction at high laser fluences.

A typical cross-sectional view of an unetched ablation mask that can be employed in the prior art as well as the present invention is shown in FIG. 1. Specifically, the unetched ablation mask 10 comprises a transparent substrate 12, a layer of material 14 having a high UV light refractivity, e.g. aluminum, deposited on the surface of transparent substrate 12 and a photoresist layer 16 which is positioned on predetermined areas of layer 14 such that other areas of layer 14 are left exposed 18.

Although ablation masks are known in the art, there still exists a problem with patterning those masks by chemical etching processes and dry etching processes. The problems associated with these prior art processes are shown in FIGS. 2, 3 and 4. In each of those figures, layer 14 is composed of aluminum.

Specifically, FIG. 2, which represents a prior art process of fabricating a laser ablation mask, shows a cross-sectional view of the mask of FIG. 1 after etching the mask with a chemical etchant. It should be noted that like elements in the figures have like numerals. The chemical etched mask 20 has an undercut 22 on each edge of photoresist layer 16. This property of undercutting the photoresist, which is associated with chemical etching processes, makes it impossible to achieve sub-ten micrometer geometries reproducibly.

In the case of dry etching, ion beam etching (IBE) and reactive ion etching (RIE) are known in the art. These dry etching techniques are both line-of-sight etching processes and are able to produce higher resolution patterns with tighter dimensional control. Despite this, each of those dry etching techniques suffer from unique problems.

The major problem associated with IBE is that edges of all features of the mask are etched at a faster rate due to a higher flux of incident ions. This phenomenon is caused by the reflection of ions off the sidewalls of the photoresist layer. This property is referred to in the art as "trenching" and it typically causes a roughening at the edges of the ablated features. Reference in this regard is directed to FIG. 3 which represents a prior art process of etching the aluminum ablation mask shown in FIG. 1 by IBE. Specifically, FIG. 3 shows that the IBE mask 30 contains trenches 32 which penetrate into the surface of transparent substrate 12.

Also, when very thick aluminum films are deposited on a substrate (≧1 micrometer), the morphology of the film is granular and thus the surface of the film is rough. During IBE, this roughness is transferred into the substrate, which will ultimately cause a decrease in the effective laser fluence incident on the substrate during ablation due to scattering of the laser light. If the roughness is too severe, local masking will occur thus preventing ablation.

The problem typically encountered using RIE is the formation of tall, narrow pedestals of unetched material at the bottom of the pattern feature. This phenomenon which is referred to herein as "grass" is caused by the localized masking of layer 14 during RIE. These pedestals are impervious to further etching leaving the masks unusable. Reference in this regard is directed to FIG. 4 which represents a prior art process of etching the ablation mask shown in FIG. 1 by RIE. Specifically, the RIE mask 40 contains pedestals of unetched aluminum 42, i.e., "grass", which cannot be removed by further RIE.

SUMMARY OF THE INVENTION

One object of the present invention is to provide a method for fabricating a mask for use in laser ablation at laser fluences in the range from about 200 mJ/cm$^2$ to at least about 500 mJ/cm$^2$.

Another object of the present invention is to provide a method of fabricating an ablation laser mask which does not contain any trenches, rough surfaces or unetched pedestals, i.e. "grass", thereon.

A further object of the present invention is to provide a method of fabricating an ablation mask which has high resolution and which is capable of providing a high quality image to a target material.

These as well as other objects are achieved by the present invention by combining the techniques of dry and chemical etching. Specifically, in accordance with the present invention, a method of fabricating high resolution laser ablation masks for use at laser fluences of greater than 200 mJ/cm$^2$ is provided which comprises the steps of:

(a) providing an unetched laser ablation mask, said unetched laser ablation mask comprising a transparent substrate, a layer of material having a high UV light refractivity deposited on said transparent substrate, and a photoresist layer positioned on a predetermined area of said high UV light refractivity material layer leaving other areas of said high UV light refractivity material layer exposed;

(b) subjecting said unetched laser ablation mask to dry etching under conditions sufficient to etch some portions of the exposed high UV refractivity material layer while leaving other portions of the exposed high UV light refractivity material layer unetched; and (c) contacting said dry etched laser ablation mask with a chemical etchant under conditions sufficient to etch said remaining portions of said exposed high UV light refractivity material layer unetched in step (b).

In step (b) of the present invention, dry etching may be carried out by either ion beam etching (IBE) or reactive ion etching (RIE). When IBE is employed in step (b) of the present invention, it is conducted under conditions sufficient to etch the exposed high UV light refractivity material areas to about a depth at which trenches first begin to contact the surface of the transparent substrate without penetrating the surface of the transparent substrate.

When RIE is employed in step (b) of the present invention, the conditions employed in step (b) are sufficient to etch the exposed areas of said high UV light refractivity material layer, whereby, after RIE, pedestals of unetched high UV light refractivity material remain in said exposed areas. The pedestals are then removed by contacting the reactive ion etched ablation mask with a chemical etchant under conditions sufficient to remove said pedestals therefrom.

DETAILED DESCRIPTION OF THE INVENTION

Figure 1:
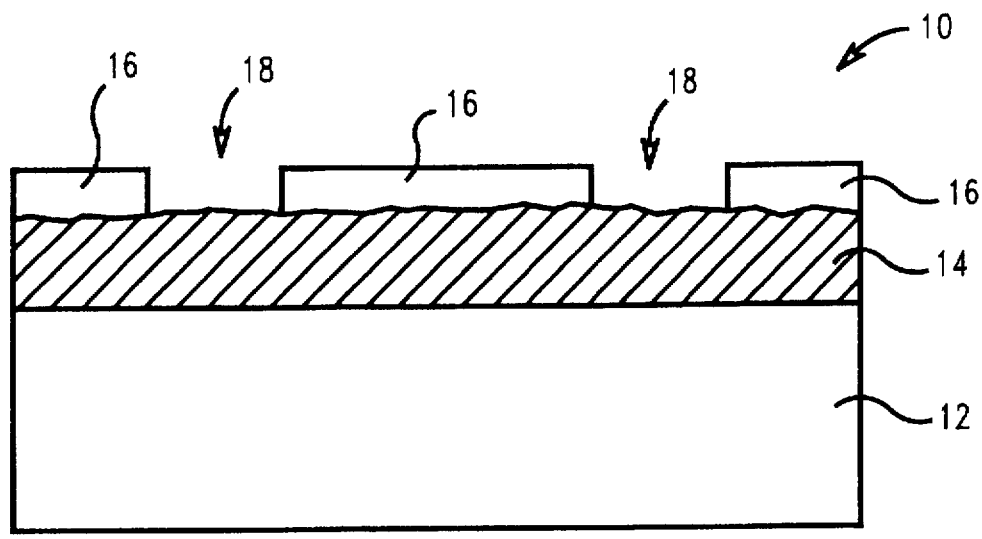
FIG. 1 is a cross-sectional view of an unetched ablation laser mask used in the prior art as well as in the present invention.

As stated above, the present invention provides a method of fabricating ablation masks which have high resolution and which are capable of withstanding high laser fluences above about 200 mJ/cm$^2$. That is, the masks provided by the present invention have a very high damage threshold which makes them suitable for use in a wide range of laser ablation applications. Specifically, the method of the present invention combines the techniques of dry etching and chemical etching.

In one embodiment of the present invention, IBE and chemical etching are combined to provide an effective method of fabricating an ablation mask which does not contain any trenches or roughness on the surface of the transparent surface. In a second embodiment of the present invention, RIE and chemical etching are combined to provide an effective method which produces an ablation mask which does not contain any pedestals of unetched high UV light refractivity material on the surface of the transparent substrate.

The present invention and the problems its solves will be described in more detail by referring to the figures present herein.

Reference is again made to FIG. 1 which shows a cross-sectional view of an unetched ablation mask that is used in the present invention. Specifically, the unetched ablation mask 10 comprises a transparent substrate 12, a layer of material 14 having a high UV light refractivity, e.g. aluminum, deposited on the surface of transparent substrate 12 and a photoresist layer 16 which is positioned on predetermined areas of layer 14 such that other areas of layer 14 are left exposed 18.

Any transparent substrate well known to those skilled in the art can be used in the present invention provided that it is transparent to the wavelength(s) of the laser being used in the ablation process. Typically, the transparent substrates employed in the present invention are free of any impurities. Suitable transparent substrates which meet these limitations include, but are not limited to, quartz, CVD diamond and calcium fluoride. Of these transparent substrates, those composed of quartz which contain UV grade synthetic fused silica are most highly preferred. The thickness of the transparent substrate employed in the present invention is not a critical limitation of the instant invention.

A layer of material 14 having a high UV light refractivity is then deposited on the surface of transparent substrate 12 by using techniques well known to those skilled in the art. The term "high UV light refractivity" as used herein denotes that the material of layer 14 is capable of refracting about 90% or more of the incident UV light used in the ablation process. For example, layer 14 may be deposited on the surface of transparent substrate 12 by E-beam evaporation or by sputtering. Of the high UV light refractivity materials contemplated herein, aluminum is most highly preferred in the present invention. It should be noted that while the remaining description is specific for aluminum it is also applicable to other high UV light refractivity materials.

The thickness of aluminum layer 14 that is being deposited on transparent substrate 12 must be about 3 µm or greater. Such a thickness has proven to be sufficient to withstand laser fluences in the range from above about 200 mJ/cm$^2$ to at least 500 mJ/cm$^2$ which is the energy range typically associated with laser ablation practice. The upper thickness of the aluminum layer is typically about 6 µm. This upper thickness limitation avoids resolution difficulties with respect to the aperture sizes required in the aluminum layer for the processing of microelectric target material.

The photoresist layer 16 employed in the present invention is a conventional photoresist that is well known to those skilled in the art. Suitable photoresists that may be used in the present invention are composed of UV-light sensitive organic polymers which contain a pattern thereon.

Figure 2:
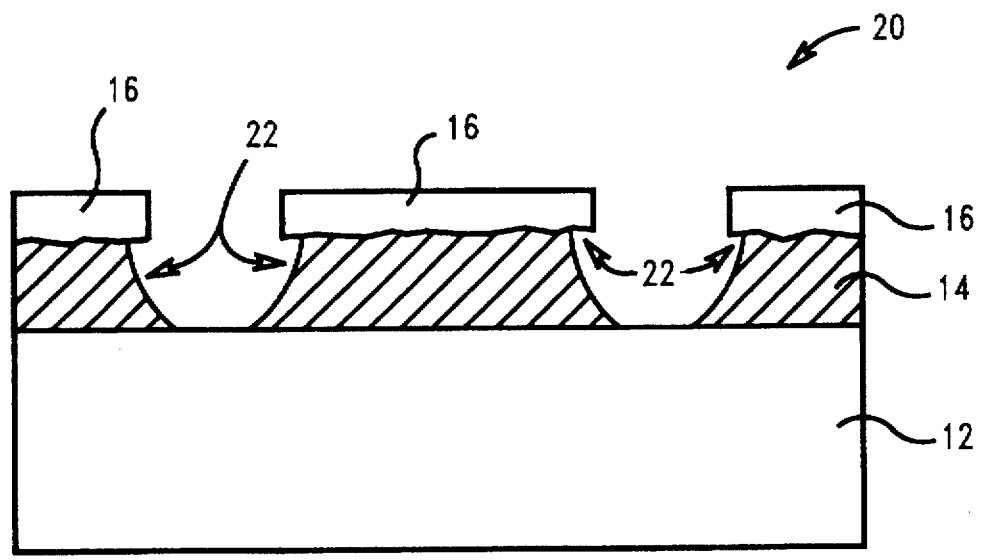
FIG. 2 is a cross-sectional view of the ablation mask shown in FIG. 1 after subjecting the same to chemical etching.
Figure 3:
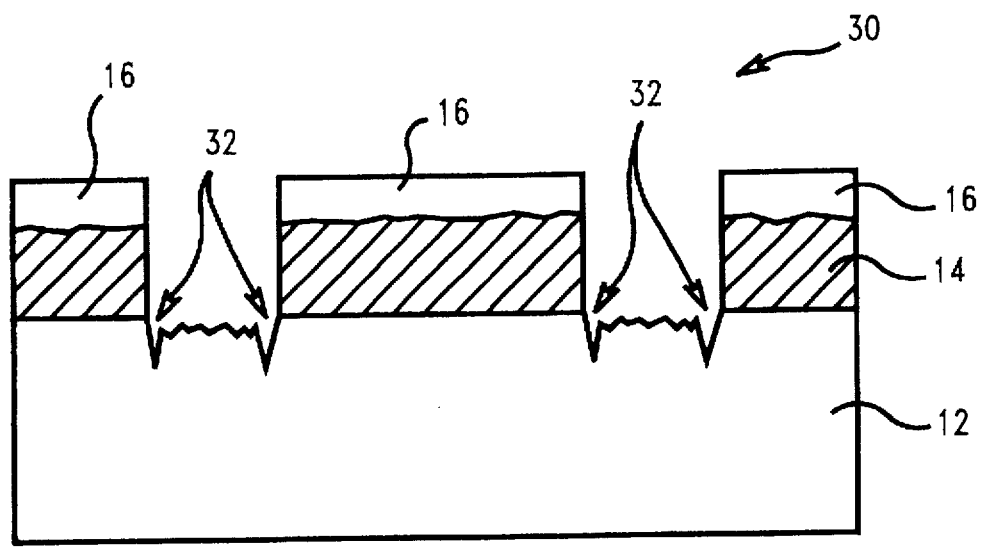
FIG. 3 is a cross-sectional view of the ablation mask shown in FIG. 1 after subjecting the same to IBE.
Figure 4:
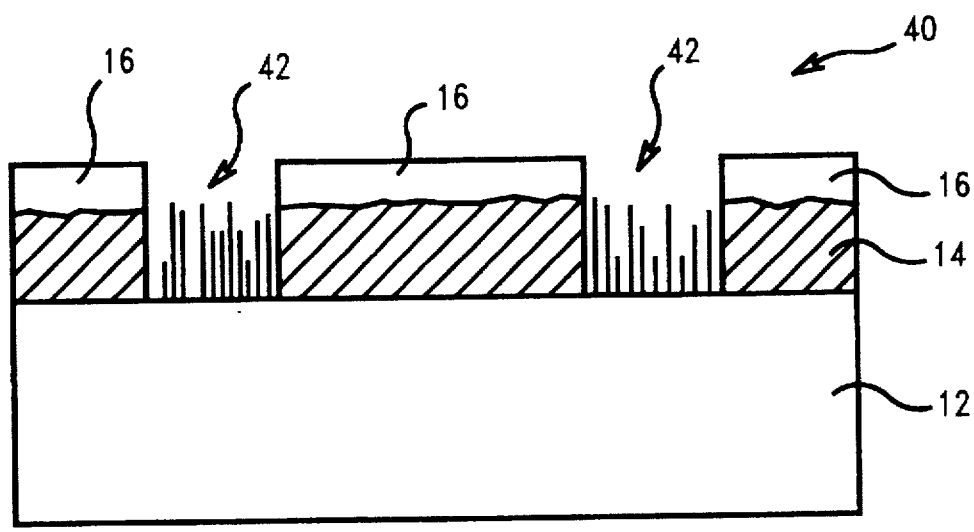
FIG. 4 is a cross-sectional view of the ablation mask shown in FIG. 1 after subjecting the same to RIE.
Figure 5A:
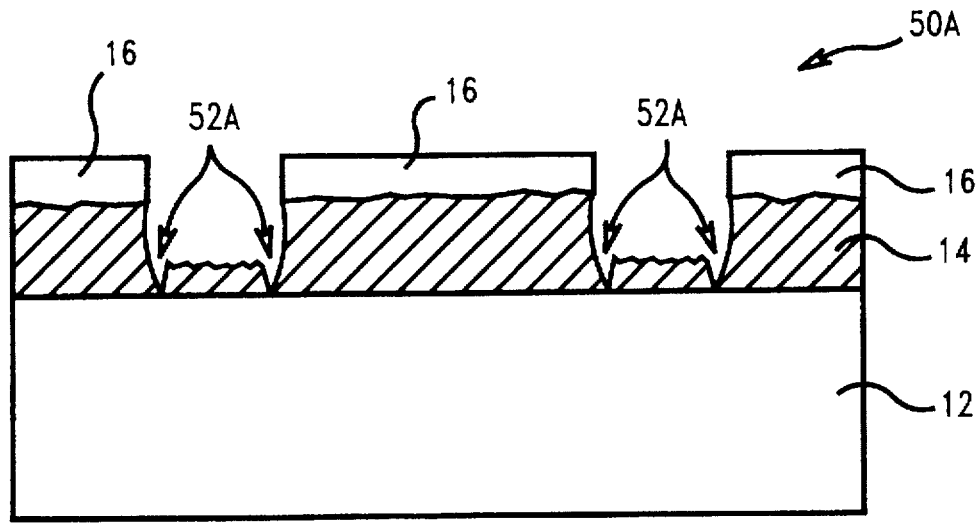
FIGS. 5 A and B are cross-sectional views of the ablation mask shown in FIG. 1 after subjecting the same to (A) IBE, and (B) chemical etching.

As indicated above, the drawbacks in the prior art processes of fabricating aluminum laser ablation masks, which are illustrated in FIGS. 2, 3, and 4, are overcome by the methods of the present invention which are shown in FIGS. 5A & B and 6A & B and which are discussed in more detailed hereinbelow.

Specifically, FIGS. 5A and B represent the first embodiment of the present invention wherein the aluminum ablation mask of FIG. 1 is first subjected to IBE and then chemical etched using a chemical etchant. In accordance with the first embodiment of the present invention, the aluminum ablation mask shown in FIG. 1 is subjected to IBE under conditions which are sufficient to etch said exposed aluminum areas 18 to about a depth at which trenches 52A first begin to contact the upper surface of transparent substrate 12. The IBE etched aluminum ablation mask 50A is shown in FIG. 5A.

The depth at which trenches 52A first begin to contact transparent substrate 12 is dependent upon the thickness of aluminum layer 14. Typically, in the present invention, IBE is conducted so that at least about 0.5 µm of the aluminum layer 14 in the exposed areas 18 is left behind after IBE. This amount of aluminum not etched by IBE is sufficient to form trenches 52A in the aluminum layer 14 without causes trenches 52A to penetrate into transparent substrate 12. For example, when metal layer 14 has a thickness of 3 µm, the IBE is carried out so that about 2.5 µm of aluminum layer 14 is etched out.

IBE is conducted using techniques that are well known to those skilled in the art. Typically, in the present invention, IBE is conducted at a pressure of from about 0.03 mTorr to about 0.06 mTorr. More preferably, the IBE is conducted at a pressure of from about 0.04 mTorr to about 0.05 mTorr. Ion energies of from about 300 V to about 1000 V are typical used in the present invention. More preferably, the ion energy during IBE is from about 400 V to about 500 V.

Typically, in the present invention, IBE is conducted for a time period of from about 100 min. to about 250 min. More preferably, IBE is carried out for about 125 min. to about 150 min.

Any type of inert gas may be employed in the present invention as the ion beam source. Specific types of inert gases include, but are not limited to, He, Ar, Ne, Kr, Xe and the like. Of these gases, Ar is particularly preferred as the ion source. Mixtures of one or more of the aforementioned inert gases are also contemplated herein.

Next, IBE aluminum ablation mask 50A is contacted with a chemical etchant under conditions which are sufficient to etch the unetched aluminum from exposed areas 18.

Any chemical etchant known to those skilled in the art which can etch aluminum layer 14 may be employed in the present invention. Typical examples of such chemical etchants include, but are not limited to, phosphoric acid, chromic acid, nitric acid, acetic acid and potassium hydroxide solutions. Mixtures of one or more of these chemical etchants are also contemplated herein. The chemical etchants also may be used in combination with water. Of the chemical etchants mentioned hereinabove, a mixture of nitric, phosphoric and acetic acids is highly preferred.

The chemical etchant may be present in a bath wherein IBE ablation mask 50A is immersed therein or it can be sprayed directly onto the mask.

Chemical etching is typically carried out in the present invention at a temperature of from about 21° C. to about 60° C. for a time period of from about 2 min. to about 15 min. More preferably, chemical etching is carried out at a temperature of from about 40° C. to about 50° C. for a time period of from about 4 min. to about 10 min.

Figure 5B:
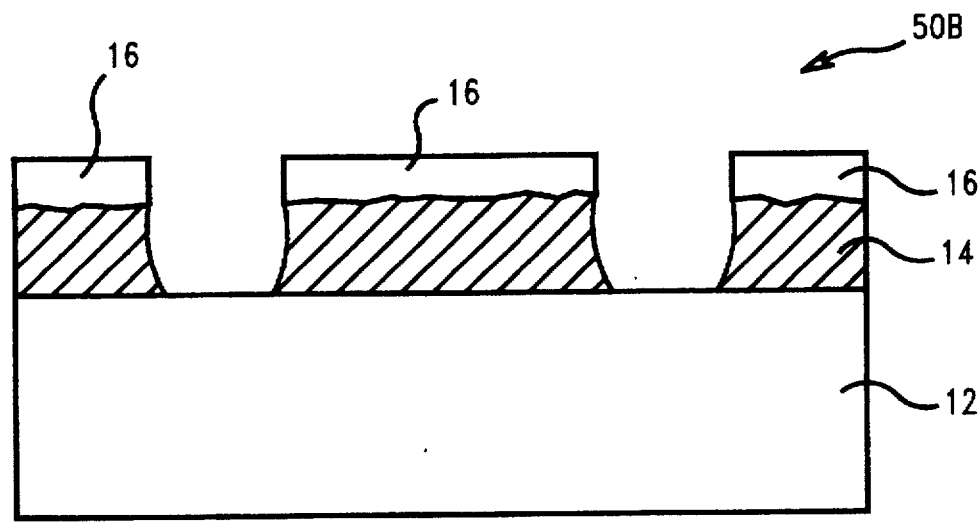

The final aluminum ablation mask 50B prepared in accordance with the first embodiment of the present invention is shown in FIG. 5B. It should be emphasized that before the mask is used as a laser ablation mask, the photoresist layer 16 is removed by standard photolithographic methods.

Figure 6A:
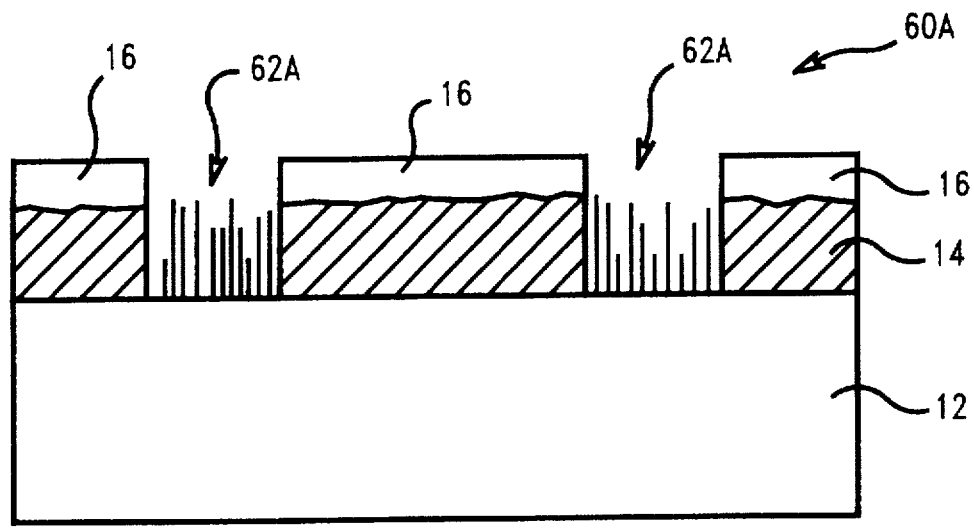
FIGS. 6 A and B are cross-sectional views of the ablation mask shown in FIG. 1 after subjecting the same to (A) RIE, and (B) chemical etching.

In the second embodiment of the present invention, the unetched mask shown in FIG. 1 is first subjected to RIE and then chemical etching. Specifically, the mask shown in FIG. 1 is first subjected to RIE under conditions which are sufficient to etch the exposed areas 18 of aluminum layer 14. The RIE etched mask 60A is shown in FIG. 6A. It is emphasized that the RIE process leaves pedestals 62A of unetched aluminum on the mask.

RIE is conducted using techniques known to those skilled in the art. The reactive gases used in RIE are typically $BCl_3$ and $Cl_2$. Generally, the pressure of the gas during RIE is from about 10 mTorr to about 100 mTorr. More preferably, the pressure of the reactive gas during RIE is from about 20 mTorr to about 30 mTorr. Those pressures correspond to a plasma-sheath potential of from about 200 V to about 800 V. More preferably, the plasma-sheath potential during RIE is from about 300 V to about 400 V.

In accordance with the present invention, RIE is conducted for about 30 min. to about 200 min. More preferably, RIE is conducted for about 60 min. to about 80 min.

After the RIE step, the RIE etched mask 60A is contacted with a chemical etchant under conditions which are sufficient to remove the pedestals 62A therefrom.

The chemical etchants and the conditions employed in the second embodiment of the present invention are the same as those reporting hereinabove in the first embodiment of the present invention. The chemical etchants may be used in a bath or sprayed directly onto the mask using techniques known to those skilled in the art.

Figure 6B:
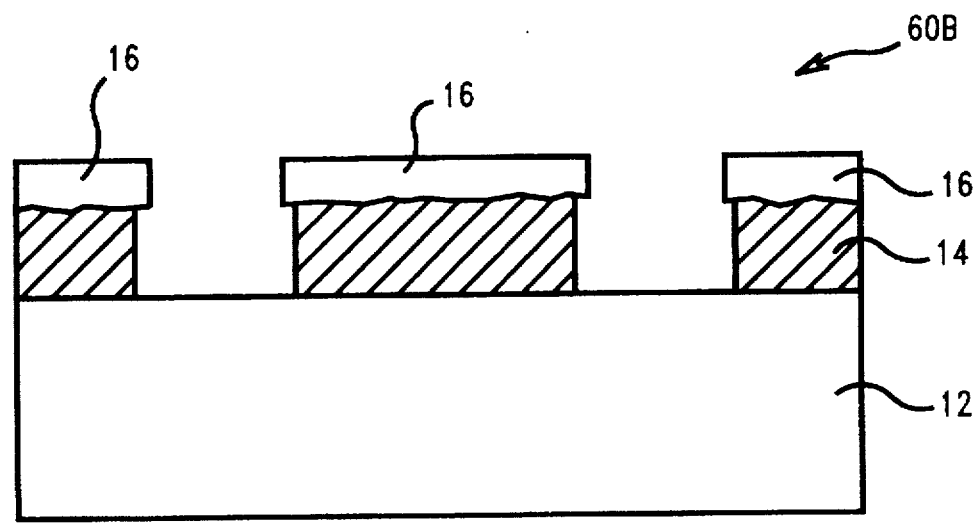

The final etched mask 60B prepared in accordance with the second embodiment of the present invention is shown in FIG. 6B. The photoresist layer 16 is removed by standard photolithographic methods and then the mask is used as an ablation mask.

7

The basic technique of laser ablation, as practiced in the present invention, is described in U.S. Pat. No. 4,923,772, the contents of which are incorporated herein by reference. Briefly, the energy source from a laser, such as an excimer laser, is directed through the laser ablation mask to fall directly on a suitable target substrate or to be processed (e.g. reduced) through a projector arrangement and subsequently directed onto the target.

As stated above, the metal ablation masks prepared in the present invention have a high damage threshold ($\geq 200$ mJ/cm$^2$), a high resolution and a high optical quality. Moreover, the method of the present invention provides high dimensional control which is improved by about 7× over conventional processes used in the prior art.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A method of fabricating an ablation mask for use with lasers having a fluence in the range of from about 200 mJ/cm$^2$ to at least about 500 mJ/cm$^2$, said method comprises:
    (a) providing an unetched laser ablation mask, said unetched ablation mask comprising a transparent substrate, a layer of high UV light refractivity material deposited on said transparent substrate, and a photoresist layer positioned on a predetermined area of said high UV light refractivity material layer leaving other areas of said high UV light refractivity material layer exposed;
    (b) subjecting said unetched laser ablation mask to dry etching under conditions sufficient to etch portions of the exposed high UV light refractivity material layer while leaving other portions of the exposed high UV light refractivity material layer unetched; and
    (c) contacting said dry etched mask with a chemical etchant under conditions sufficient to etch those portions of said exposed high UV light refractivity material layer not etched in step (b).

2. The method of claim 1 wherein said transparent substrate is quartz, CVD diamond or calcium fluoride.

3. The method of claim 2 wherein said transparent substrate is quartz.

4. The method of claim 3 wherein said quartz contains UV grade synthetic fused silica.

5. The method of claim 1 wherein said high UV light refractivity material is composed of aluminum.

6. The method of claim 5 wherein said high UV light refractivity material layer has a thickness of from about 3 to about 6 µm.

7. The method of claim 1 wherein said dry etching is conducting by ion beam etching (IBE) or reactive ion etching (RIE).

8. The method of claim 7 wherein said dry etching is conducted using IBE under conditions sufficient to etch said exposed areas of said high UV refractivity material layer to about a depth at which trenches first begin to contact the transparent substrate without penetrating said transparent substrate while leaving a portion of said exposed high UV refractivity material layer unetched.

9. The method of claim 8 wherein said IBE is conducted using an inert gas selected from the group consisting of He, Ar, Ne, Kr and Xe.

8

10. The method of claim 9 wherein said inert gas is Ar.

11. The method of claim 8 wherein said IBE is conducted at a pressure of from about 0.03 mTorr to about 0.06 mTorr.

12. The method of claim 11 wherein said IBE is conducted at a pressure of from about 0.04 mTorr to about 0.05 mTorr.

13. The method of claim 8 wherein said IBE is conducted at an ion energy of from about 300 V to about 1000 V.

14. The method of claim 13 wherein said ion energy is from about 400 V to about 500 V.

15. The method of claim 8 wherein IBE is carried out for a period of time of from about 100 min. to about 250 min.

16. The method of claim 15 wherein IBE is carried out for a period of time of from about 125 min. to about 150 min.

17. The method of claim 8 wherein dry etching is conducted using RIE under conditions sufficient to etch the exposed areas of said high UV light refractivity material layer whereby, after RIE, pedestals of unetched high UV refractivity material are present in said exposed areas.

18. The method of claim 17 wherein said RIE is conducting using a reactive gas selected from the group consisting of BCl$_3$ and Cl$_2$.

19. The method of claim 17 wherein said RIE is conducted at a pressure of from about 10 mTorr to about 100 mTorr.

20. The method of claim 19 wherein said RIE is conducted at a pressure of from about 20 mTorr to about 30 mTorr.

21. The method of claim 19 wherein said RIE is carried out for a time period of from about 60 min. to about 80 min.

22. The method of claim 17 wherein said RIE is conducting at a plasma-sheath potential of from about 200 V to about 800 V.

23. The method of claim 22 wherein said RIE is conducting at a plasma-sheath potential of from about 300 V to about 400 V.

24. The method of claim 17 wherein said RIE is carried out for a time period of from about 30 min. to about 200 min.

25. The method of claim 1 wherein said chemical etching step is conducted at a temperature of from about 21° C. to about 60° C. for a time period of about 2 min. to about 15 min.

26. The method of claim 25 wherein said chemical etching step is conducted at a temperature of from about 40° C. to about 50° C. for a time period of about 4 min. to about 10 min.

27. The method of claim 1 further comprising the step of removing the photoresist layer from the chemical etched mask.

28. A method of fabricating an aluminum ablation mask for use with lasers having a fluence in the range of from about 200 mJ/cm$^2$ to at least about 500 mJ/cm$^2$, said method comprises:
    (a) providing an unetched aluminum laser ablation mask, said unetched aluminum ablation mask comprising a transparent substrate, a layer of aluminum deposited on said transparent substrate, and a photoresist layer positioned on a predetermined area of said aluminum layer leaving other areas of said aluminum layer exposed;
    (b) subjecting said unetched aluminum laser ablation mask to dry etching under conditions sufficient to etch portions of the exposed aluminum layer while leaving other portions of the exposed aluminum layer unetched; and
    (c) contacting said dry etched mask with a chemical etchant under conditions sufficient to etch those portions of said exposed aluminum layer not etched in step (b).

* * * * *